UNITED STATES PATENT OFFICE.

HARMON HIBBARD, OF ATTICA, NEW YORK.

IMPROVEMENT IN DYEING.

Specification forming part of Letters Patent No. 3,068, dated May 2, 1843.

*To all whom it may concern:*

Be it known that I, HARMON HIBBARD, of Attica, in the county of Wyoming and State of New York, have invented a new and Improved Mode of Preparing and Using Compounds in Dyeing, &c.; and I do hereby declare that the following is a full and exact description.

The nature of my invention consists in preparing and applying compounds as auxiliaries in dyeing, which compounds serve as menstruums and cause the fluid in which they are dissolved to remove heterogeneous matter from goods and at the same time transfuse or impregnate them with intermediates to receive coloring-matter.

To enable others skilled in the art to prepare and use my compounds, I will proceed to describe the method in full; but to avoid monotony and a too frequent reiteration of prolix appellations I designate each compound by a numeral character, and one by which I intend to represent the same compound in each respective place—*e. g.*: No. 1, sulphate of iron, muriate of soda, hydrate of lime, one pound each. No. 2, sulphate of iron, one pound; sulphate of copper, muriate of soda, eight ounces each. No. 3, sulphate of iron, sulphate of copper, one pound each; nitrate of potash, muriate of ammonia, eight ounces each. No. 4, sulphate of zinc, two pounds; muriate of soda, four ounces, and sulphate of iron sufficient to sadden. No. 5, sulphate of iron, of alumina, one pound each. No. 6, bar or yellow soap, two pounds; litharge, one pound; water, two quarts. Boil fifteen minutes.

The above mordants are proportioned for twenty pounds goods each, which mordants I dissolve in separate fluids of sixty gallons of boiling water for each compound, in which I then run the goods to be dyed from the reel wet, and continue running them in the mordant liquor quick from five to fifteen minutes, then take them out to cool. I then run them logwood liquor at boiling-heat, which I add to the mordant fluid, allowing the full extract of ten pounds good logwood-chips for each twenty pounds of goods, which I handle quick therein from five to fifteen minutes more, then rinse and dry them, and they come to the full shade. I color wool by handling briskly in the mordant fluid for about twenty minutes. I then pour in the logwood liquor with the wool into the mordant fluid, then continue boiling and handling it quick about twenty minutes more. I then lift out and spread it as even as possible to receive the air, and then rinse and dry, and the shade is full. I color hats by running them slowly in the mordant liquor for about thirty minutes at 200° Fahrenheit, which proportion is sufficient for twenty hats. I then lift them out to cool and put in the logwood extract, with one pound bruised nut-galls, and continue handling them in it for about two hours more. Then rinse and dry them. I color fur on the felt by first brushing it over with No. 6 while hot, then let it be exposed to about 180° Fahrenheit until the fur is brown. I then wash the fur clean and dry it, then wet the ends with a strong mordant liquor, and when dry again I whip up the fur and brush it over with a strong hot logwood liquor, then leave it to dry, and if not dark enough I repeat with the hot dye. I use No. 6 for wine shades on woolen goods to be colored in the above logwood liquor, and the shade depends on the length of time they are boiled in the mordant and dye—the longer the lighter and brighter. I use No. 2 for blue and blue-black on all kinds of goods, and raise the shade of blue by adding liquor to the dye near the end of the process; but the shade depends on the length of time they are boiled in the mordant and dye—the longer the darker. For a bottle green I use equal parts of logwood and fustic liquor for the dye. I use No. 3 for a black on all kinds of goods. I use No 4 for a wine or maroon shade on woolen and fur. I use No. 5 for brown on woolen.

What I claim as my invention, and desire to secure by Letters Patent, is—

The above compositions of matter, however proportioned, and their application to goods by any method in dyeing.

HARMON HIBBARD.

Witnesses:
DANIEL C. FERGUSON,
ABEL WILDER.